June 27, 1933.      E. R. PENICK      1,915,867
CHOKER
Filed May 1, 1931

Inventor
Edward R. Penick
By Hardway Lather
Attorneys

Patented June 27, 1933

1,915,867

UNITED STATES PATENT OFFICE

EDWARD R. PENICK, OF HOUSTON, TEXAS

CHOKER

Application filed May 1, 1931. Serial No. 534,172.

This invention relates to a choker.

One object of the invention is to provide a choker adapted to be incorporated into a flow line to restrain the flow of fluid therethrough.

In the production of oil, the fluid often flows from the well under strong pressure and for reasons well known to those familar with this industry, it is desirable to restrain the flow in order to prevent injury to the well. The choker herein described has been specially designed for that purpose.

Another object of the invention is to provide a choker of the character described which is of such novel construction that the fluid flowing therethrough will be so baffled, or retarded, that the gritty substance in the fluid will not readily cut away the material and enlarge the fluid passageway through the choker.

With the above and other objects in view this invention has particular relation to certain novel features of construction, arrangement of parts, and use, an example which is given in this specification and illustrated in the accompanying drawing, wherein.

Figure 1:
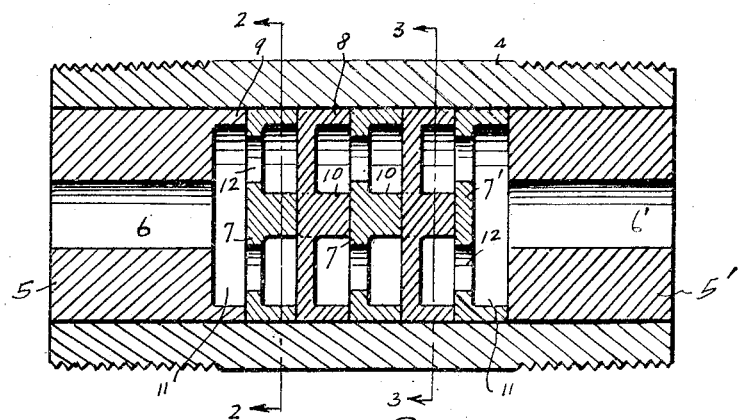
Figure 1 shows a longitudinal, sectional view of the choker.
Figure 2:
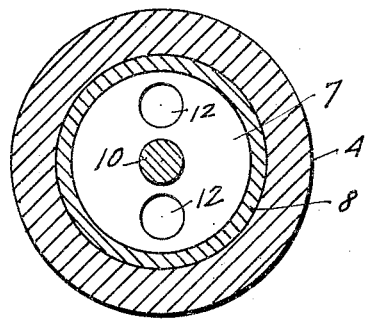
Figure 2 shows a cross sectional view taken on the line 2—2 of Figure 1.
Figure 3:
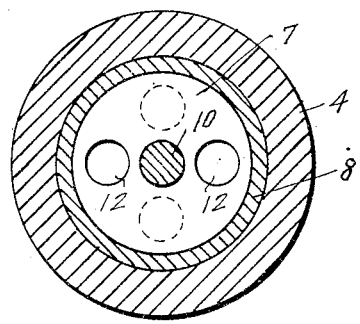
Figure 3 shows a cross sectional view taken on the line 3—3 of Figure 1.
Figure 4:
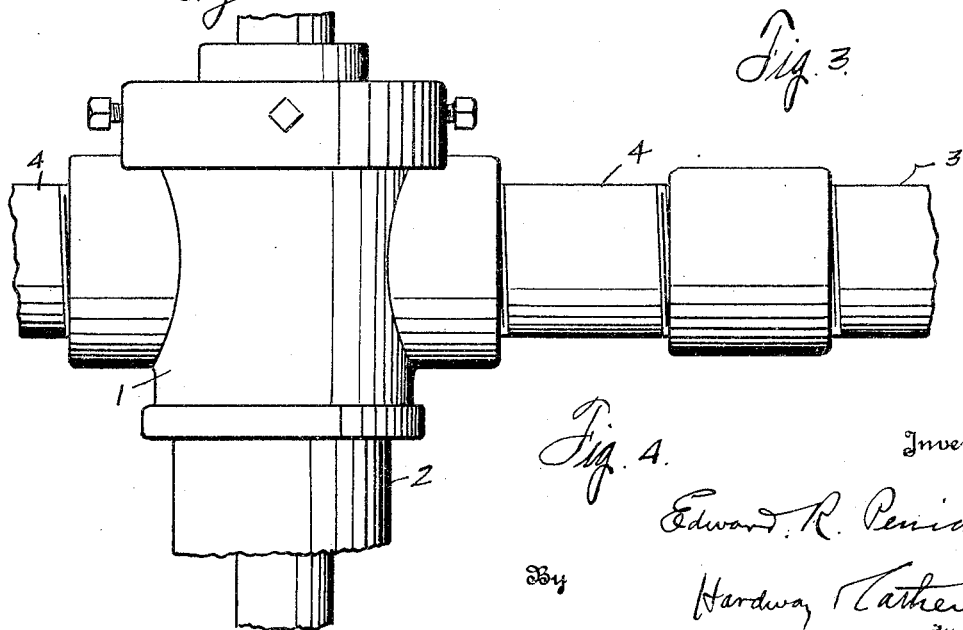
Figure 4 shows a side view of a casing head and a flow line leading therefrom having the choker incorporated therein.

Referring now more particularly to the drawing, wherein like numerals of reference designate similar parts in each of the figures the numeral 1 designates a casing head, or other well head attached to the upper end of the well casing 2 and having a lateral flow line 3 leading therefrom.

Incorporated into this flow line there is a tubular nipple 4, forming a housing, and having the glands 5, 5' driven, or otherwise secured, in the ends of said nipple. These glands have the reduced axial bores 6, 6' therethrough.

Between the glands 5, 5' there is an assembly of baffle plates 7, 7' which are fitted closely within said housing. The plate 7' is held spaced from the gland 5' in any suitable manner for example by the marginal annular flange 8' and the plates 7 are, in a similar manner spaced from the plate 7', and from each other by the marginal annular flanges 8. The gland 6 may be spaced from said plate assembly in any preferred manner, as by the annular, inner end flange 9 carried by said gland 6. The plates 7 may be reinforced and further held spaced from each other and from the plate 7' by central bosses 10 carried by such plates 7. Enlarged baffle chambers 11 are thus provided between the plate assembly and the said glands, as well as between the plates themselves.

Each baffle plate has one or more restricted ports, as 12 therethrough, these ports being, preferably, out of alignment with bores 6, 6' and the ports of each plate being staggered with respect to the ports of adjacent plates.

The fluid entering through the bore 6 will pass through said chambers and ports successively and the fluid in any chamber will retard the oncoming fluid and will in turn be retarded by the restricted ports into the next succeeding chamber, and said fluid will finally pass from the choker out through the restricted bore 6'. The velocity of the fluid will thus be reduced and the gritty substance therein will not quickly cut out and enlarge the passageway for fluid through the choker.

In case the ports through said baffle plate become too large to effectively choke the flow said plates may be readily removed and new ones substituted for them.

The drawing and description disclose what is now considered to be a preferred form of the invention by way of illustration only while the broad principle of the invention will be defined by the appended claim.

What I claim is:

1. A choker for flow lines comprising a tubular housing, a gland in each end of the housing, each gland having an axial bore and one of said glands having an inner end flange, an assembly of cup shaped baffle plates clamped in the housing between said glands, said baffle plates having ports therethrough arranged in staggered relation, spacers between the adjacent baffle plates, each spacer being formed integrally with one plate and bearing against the center of the adjacent plate of the assembly whereby the assembly of plates is reinforced throughout.

2. A choker for flow lines comprising a tubular housing, a gland in each end of the housing each gland having an axial bore, the inner end of one of said glands having an extended annular flange, an assembly of cup shaped baffle plates clamped in the housing between said flange on one side and the other gland on the other side, said baffle plates having ports therethrough arranged in staggered relation, spacers between as adjacent baffle plates, each spacer being formed integrally with one plate and bearing against the central portion of the adjacent plate of the assembly whereby the assembly of plates is reinforced throughout.

In testimony whereof I have signed my name to this specification.

EDWARD R. PENICK.